United States Patent [19]
Rose

[11] Patent Number: 5,553,480
[45] Date of Patent: Sep. 10, 1996

[54] APPARATUS FOR CALIBRATING AN INDICATING POINTER RELATIVE TO INSTRUMENT DIAL PLATE GRADUATIONS

[76] Inventor: Vincent H. Rose, 420 N. Civic Dr. #407, Walnut Creek, Calif. 94596

[21] Appl. No.: 408,729

[22] Filed: Mar. 21, 1995

[51] Int. Cl.⁶ .................................................. G01D 11/06
[52] U.S. Cl. ................................................ 73/1 R; 116/291
[58] Field of Search ............................. 73/1 B, 1 C, 1 E, 73/1 H, 2, 4 R, 4 D, 4 V, 1 R; 116/291, 303, 328

[56] References Cited

U.S. PATENT DOCUMENTS

| | | | |
|---|---|---|---|
| 240,380 | 4/1881 | Buck | 116/328 |
| 2,319,782 | 5/1943 | Rourke | 116/291 |
| 3,114,903 | 12/1963 | Murphy et al. | 340/266 |
| 3,578,931 | 5/1971 | Murphy et al. | 200/166 BD |
| 3,586,799 | 6/1971 | Murphy | 200/56 |
| 3,683,135 | 8/1972 | Oliver | 200/56 R |
| 4,021,627 | 5/1977 | Francisco | 200/56 R |
| 4,691,185 | 9/1987 | Loubier et al. | 338/32 H |
| 4,745,811 | 5/1988 | Gray | 73/708 |
| 4,768,461 | 9/1988 | Kneitzsch et al. | 116/328 |
| 4,975,687 | 12/1990 | Murphy, Jr. et al. | 340/688 |
| 5,080,035 | 1/1992 | MacManus | 116/328 |
| 5,121,109 | 6/1992 | Murphy, Jr. et al. | 340/688 |

*Primary Examiner*—Robert Raevis
*Attorney, Agent, or Firm*—Head, Johnson & Kachigian

[57] ABSTRACT

The indicating pointer of a gauge is rotatably and frictionally connected to a hub which is attached to the shaft from a meter movement for calibration of the pointer relative to the graduation indicia of the gauge, without removal and replacement of the pointer or hub from the shaft. The hub may include a gap within which the pointer is nestable and has limited movement.

5 Claims, 3 Drawing Sheets ately, to a
APPARATUS FOR CALIBRATING AN INDICATING POINTER RELATIVE TO INSTRUMENT DIAL PLATE GRADUATIONS This invention relates to gauges and, in particular, improvements in attaching and calibrating an indicating or reading pointer of a gauge to a shaft.

Instrument gauges are common instruments specifically configured to give an indication of and/or monitor various parameters such as temperature, pressure, liquid levels, or various electrical properties. Typically, the gauge is made up of a gauge movement which is arranged and connected to respond to a particular sensed condition. The sensed condition may be any one of the aforesaid parameters. Examples of various movement which may be utilized are air core, diaphragm, Bourdon tube or D'Arsonval-type movements. The movement is connected to a shaft and ultimately to a pointer which typically passes over a gauge face plate to provide the visual reading of the sensed condition relative to indicia or graduation on the face plate. See, for example, face or dial plates shown in FIGS. 4 and 5 of U.S. Pat. No. 5,121,109. A significant problem is calibrating the reading or indicating pointer on the output shaft from the gauge movement relative to the face plate indicia. Heretofore, calibration has been done by placing the pointer on a shaft in line with a predetermined parameter mark on the face plate which is supposed to agree with the angular position of the movement shaft at a given sensed condition and thus, give an accurate reading. If the placement is not quite right, the pointer must be pulled off the shaft, and the procedure repeated until the proper placement of the pointer is achieved. In addition, the placement of the pointer may not, in some instances, be perfectly related to the sensed condition from the movement creating the rotation of the shaft. Again, the pointer must be pulled off the shaft, and the procedure repeated until calibration is achieved. Not only is this time consuming, but the shaft bearing surfaces of the pointer may be damaged in the process of pointer removal and replacement.

Although two piece pointers are known, they are typically fixed to each other either as the same part or the hub is fixed to the pointer by friction, mechanical interlock, adhesive or attachment by heat staking and incapable of the adjustment as disclosed herein.

SUMMARY OF THE INVENTION

It is an object of this invention to enable limited rotation of the pointer, in relation to the gauge movement shaft, after the hub of the pointer has been fixed upon the shaft.

Broadly, the invention is directed to any form of pointer device attachable to any form of shaft, e.g., splined, press-fit or straight, where the pointer can be adjusted after it has been attached to the shaft.

Specifically, the invention is directed to an instrument gauge of the type having a gauge movement that is responsive to a sensed condition. The sensed condition is then translated to a rotatable shaft. In its broadest form, the assembly includes a hub that is attached to the rotatable shaft with an indicating pointer that is frictionally attached yet independently rotatable about the hub for any degree of movement for calibrating purpose. In another embodiment, a slot of width "A" is provided in the periphery of a cap/hub within which the indicating pointer is nested and moveable to a proper relationship of the pointer to the gauge markings as representative of the actual sensed condition.

DETAILED DESCRIPTION OF THE PREFERRED EMBODIMENT

While the invention has been described with a certain degree of particularity, it is manifest that many changes may be made in the details of construction and the arrangement of components without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

Figure 2:
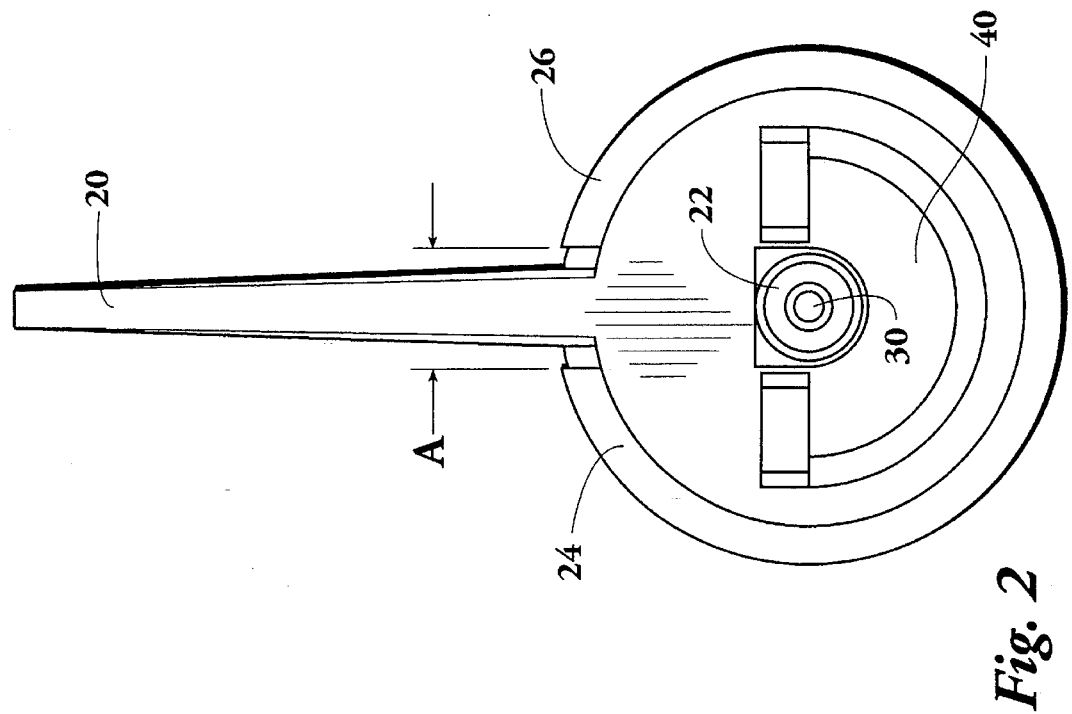
FIG. 2 is a forward view taken along the line 2—2 of FIG. 1.
Figure 1:
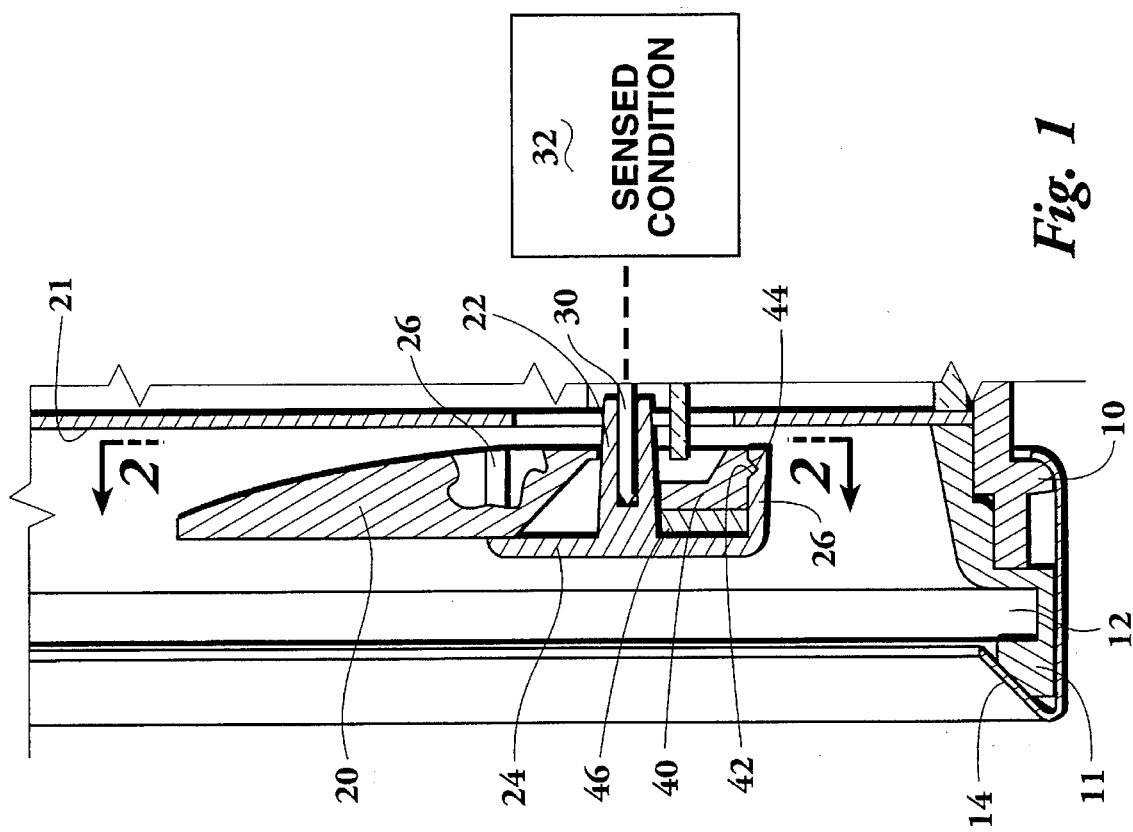
FIG. 1 is a sectional view of an adjustable pointer including some of the basic parts of an instrument gauge.

Referring now to FIGS. 1 and 2, a typical instrument gauge to which this invention is used includes an assembly, as partially shown, of a housing 10 having face or dial plate 21, a seal boot 11, a lens 12, and a bezel 14 used in this instance to retain the assembly as is well known in the art. The dial plate has indicia or graduations thereon based upon the particular gauge parameters together. The apparatus of this invention includes an indicating or reading pointer 20 which is frictionally and rotatably connected to a combination central hub 22 and cap 24 which is attached to instrument shaft 30 that rotates from movement 32 based upon a sensed condition. In this embodiment, the cap 24 has a cylindrical body or skirt 26 which includes an open gap indicated at "A" into which the reading pointer 20 is nested. The pointer 20 includes a lower tail portion 40 that has a protuberance 42, V-shaped in this instance, which retains the pointer in a matching groove 44 of the cap cylindrical body 26. A counterweight 46 may be used as a part of the assembly. In the embodiment of FIGS. 1 and 2, the rotational movement of the pointer about the hub is limited by the amount of opening "A".

Figure 4:
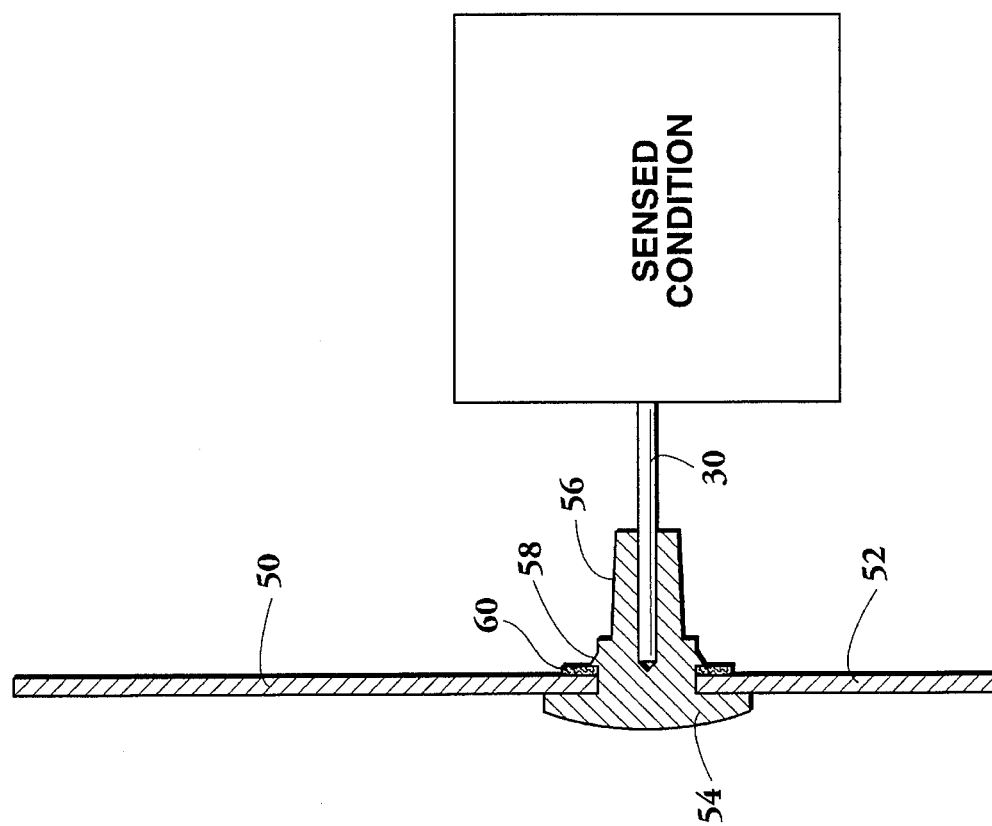
FIGS. 3 and 4 represent respective front elevation and cross section views of another embodiment of the invention.
Figure 3:
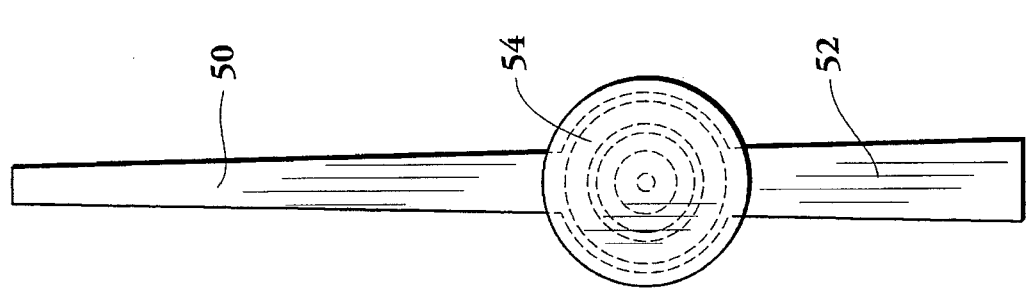

In the embodiments of FIGS. 3 and 4 and 5, 6 and 7, the rotational movement of the pointer about a hub is unlimited. In FIGS. 3 and 4 a metal or plastic pointer 50 may include a tail or counterweight portion 52. Cap 54 includes a hub 56 which is attached to shaft 30 from the instrument gauge movement. The pointer is frictionally engaged or frictionally retained to cap 54 upon shoulder 58. An elastic retainer, spring or washer 60 of metal or elastomer material substantially retains the pointer 50 axially to the cap and shoulder 54/58 but allows relative frictional rotative movement for the calibration by grasping the cap 54 and, thence, rotate the pointer 50.

Figure 7:
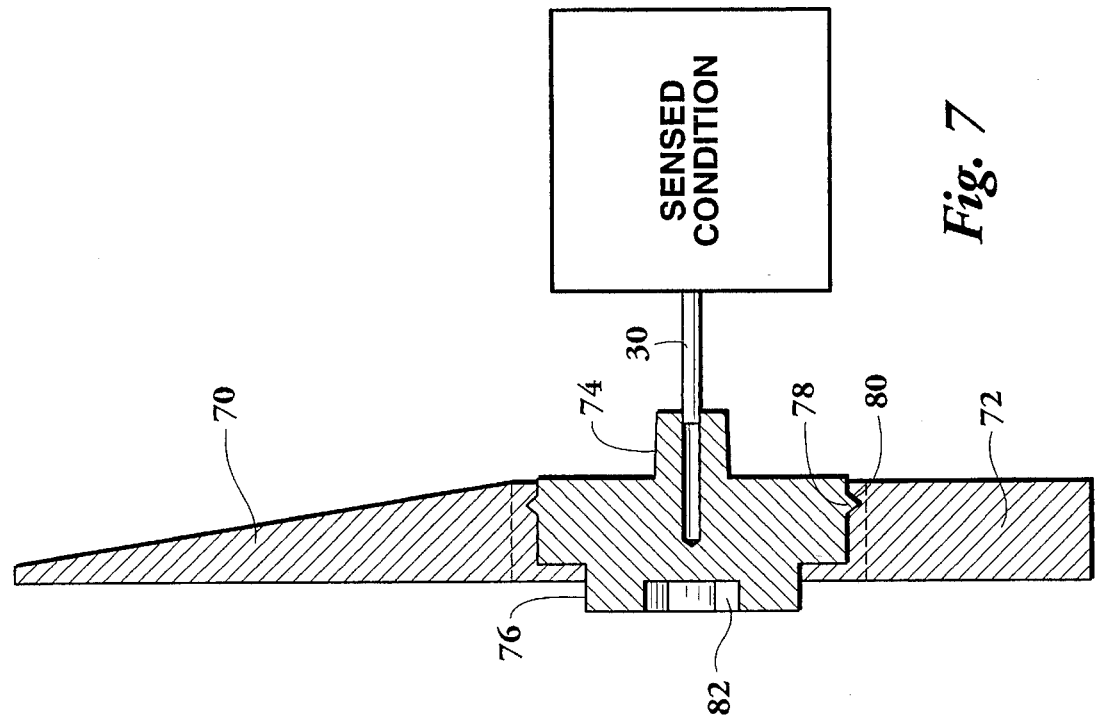
FIGS. 5, 6 and 7 represent respective side, front elevation and cross section views of a yet further embodiment of the invention.
Figure 6:
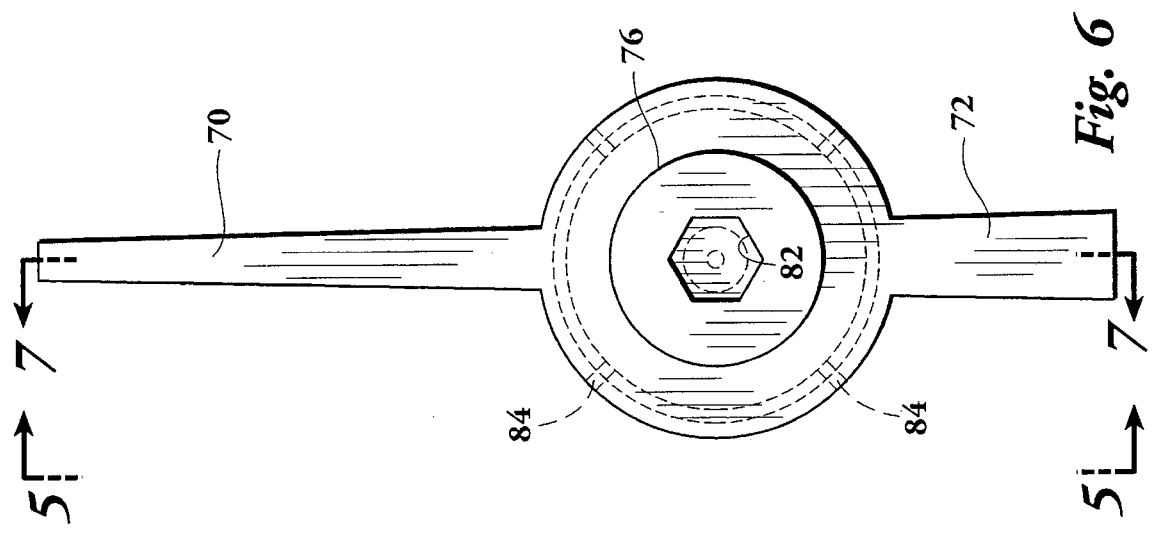
Figure 5:
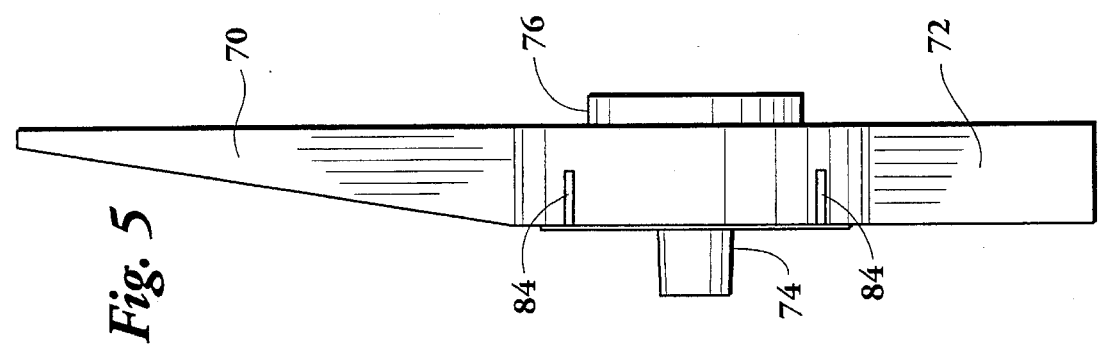

The embodiment of FIGS. 5, 6 and 7 includes a pointer 70 and counterweight tail 72. A co-axial hub 74 is attached to the gauge movement shaft 30 as heretofore described. The pointer is frictionally yet rotationally retained about the hub 74 which includes a forward peripheral portion 76. A peripheral protuberance 78 on the hub 74 engages with a matching groove 80 of the pointer 70 and provides a 'snap fit' of the parts to retain the pointer and hub assembly. A forward part of the hub includes a socket for the receipt of a wrench or other tool to hold the hub while rotating the pointer to a calibrated position. In this embodiment one or a plurality of slots 84 are provided about the inner periphery of the pointer which provides some flexibility to allow the parts to 'snap' together.

Figure 8:
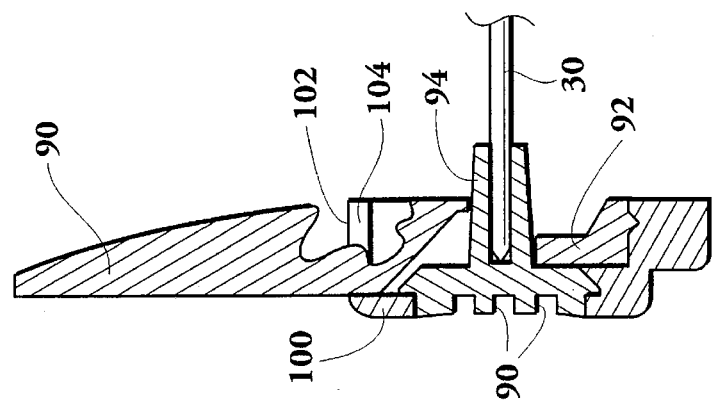
FIG. 8 is a sectional view of another embodiment.

FIG. 8 represents still another assembly of a pointer 90, having a tail or counterweight 92, which is frictionally, yet rotatably retained to a hub 94, the latter including tool recesses 98. In this embodiment, a second cap 100 may include a cylindrical portion 102 with a slot 104 of width "A" as is described previously. The pointer 90 is nested in the slot 104 and is rotatable relative to the second cap 100 within the limits of the slot 104. The second cap 100 can be frictionally rotated relative to the hub 94 providing even further range of rotation to the pointer during calibration.

In operating the invention the pointer is positioned relative to what is believed to be the proper graduation indicia on the face of a dial plate (not shown but well known in the art) that is indicative of the sensed condition. That is, if the sensed condition is zero, then the pointer is placed at the "0" graduation. However, in doing so, often the pointer does not exactly end up at the zero angular position of the shaft 30. In that event, minor adjustment is made, without removing the assembly from the shaft 30, by holding the cap/hub and rotating the pointer relative thereto. In the embodiment of FIG. 1 and 2, the movement is limited within the gap "A" to effect the correct setting. The range of adjustment, although not limiting, is typically within a range of 2°–10° or more.

In the embodiments of FIGS. 3–7 there are no angular limits of the relative movement of the pointer to the cap/hub.

What is claimed is:

1. A gauge comprising:

a gauge having means responsive to a sensed condition, said means being translated to a rotatable shaft;

an indicating pointer;

an inner hub attached to said rotatable shaft, said pointer being rotatably and frictionally retained to said inner hub; and said inner hub having an outer cylindrical body, said body having an axial slot of width "A" within which said indicating pointer is nested for relative rotation therewith without removal of said inner hub.

2. The gauge of claim 1 including a dial plate, positioned relative to said indicating pointer, with graduations thereon indicative of the condition being sensed.

3. The gauge of claim 1 wherein said pointer includes a tail portion having a protuberance which co-acts within a matching groove in said cylindrical body.

4. The gauge of claim 1 wherein said pointer includes a tail portion and a counterweight assembled within said outer cylindrical body.

5. The gauge of claim 1 wherein the width of said slot "A" provides rotatable or arcuate movement of said pointer within the range of 2°–10°.

* * * * *